Sept. 18, 1934.  A. A. HEINZELMANN  1,974,108
VARIABLE SPEED TRANSMISSION
Filed March 7, 1932   7 Sheets-Sheet 1

INVENTOR
Alphonse A. Heinzelmann
BY
his ATTORNEY

Sept. 18, 1934.    A. A. HEINZELMANN    1,974,108
VARIABLE SPEED TRANSMISSION
Filed March 7, 1932    7 Sheets-Sheet 3

INVENTOR
Alphonse A. Heinzelmann
BY
ATTORNEY

Sept. 18, 1934.    A. A. HEINZELMANN    1,974,108
VARIABLE SPEED TRANSMISSION
Filed March 7, 1932     7 Sheets-Sheet 4

Fig. 4.

INVENTOR
Alphonse A. Heinzelmann
BY
ATTORNEY

Sept. 18, 1934.   A. A. HEINZELMANN   1,974,108
VARIABLE SPEED TRANSMISSION
Filed March 7, 1932    7 Sheets-Sheet 5

Patented Sept. 18, 1934

1,974,108

UNITED STATES PATENT OFFICE 1,974,108

VARIABLE SPEED TRANSMISSION

Alphonse A. Heinzelmann, New York, N. Y., assignor to Bludalk, Inc., New York, N. Y., a corporation of New York Application March 7, 1932, Serial No. 597,237

41 Claims. (Cl. 74—14)

My invention relates to transmissions and refers particularly to variable speed transmissions.

One of the objects of my invention is a device in which the rotatable speed of a driven member may be governed and controlled by the rotatable speed of the driving member without the interposition or necessity of change-speed or gear shift mechanism.

The many disadvantages of gear-shift transmissions are generally recognized and while numerous attempts have been made to devise transmissions eliminating the use of gear-shifts none of them has been sufficiently efficient to meet with general practical adoption.

While transmissions are employed in many machines for the transmission of variable speeds, their principal application is found in automobiles, in which the constant changing of power requirements makes them a most important element of automobile machine construction.

Although the present employed automobile transmissions involving gear-shifts have considerable value for the transmission of variable power, they possess many disadvantages, particularly because their application is generally controlled by those unfamiliar with their operation, consequently, frequently resulting in serious injury to the mechanism; and a special disadvantage of such gear-shift transmissions is that a measurable period of time is required in order to shift from one gear to another during which period the desired change of speed of the automobile is not accomplished; and as a rapid change of speed is frequently imperative in automobiles, such gear-shift transmissions are dangerous to safety.

It is evident, therefore, that a transmission, free from gear-shifts and having a constantly changing speed of the driven member dependent only upon the speed of the engine, would have high efficient and safety values over the gear-shift type of mechanism.

The device of my invention overcomes the above mentioned and many other objectionable features of the gear-shift transmissions and presents a transmission in which the speed of the driven member is controlled entirely by the speed of the driving member.

The transmission of my invention comprises a device in which the revolution of the driving member produces a centrifugal force upon the driven member causing the latter to revolve and in which the centrifugal force, increases with the increased speed of revolution of the driving member.

Further, it will be evident upon a consideration of my device, that as the increasing speed of the driving member increases the centrifugal force, the power of the driven member will increase.

I thus present a transmission, free from gear-shifts, and in which the power and speed of the driven member are controlled by the speed of the driving member, thus overcoming the dangers and difficulties incident to transmissions involving the use of gear-shifts.

In the particular form of the device of my invention disclosed in the accompanying drawings, similar parts are designated by similar numerals.

The particular form of the device of my invention shown in Figures 1 to 9, inclusive, of the accompanying drawings consists of a housing 10 within which is the power unit as described later.

The power unit consists of a drive shaft 11 carrying a square bushing 12 fixedly attached thereto by means of a key 13. A fly wheel 14 carrying the plate 15 and the square hub 16 is fixedly attached to the drive shaft 11, the hub 16 being positioned upon the bushing 12. The fly wheel 14 also carries the shaft 17 which is connected to a means of revoluble power not shown.

The drive shaft 11 carries a fixedly attached spider having the two extended arms 18 and 19. The spider arm 18 carries a fixedly attached hollow shaft 20 which extends through an opening in the outer extremity of the spider arm 18, this shaft 20 acting as a pivotal point for the carriage arms 21 and 21' as explained later. The carriage arms 21 and 21' are attached to the spider arm 18 by means of a threaded member 80 having a flange 81 and a lock screw 82. The spider arm 19 carries a fixedly attached hollow shaft 22, which extends through an opening in the outer extremity of the spider arm 19, this shaft acting as a pivotal point for the carriage arm 23 and 23' as explained later.

The roller carriages referred to generally as 24, 25, 24' and 25', consist each of two main elements as herein described.

The roller carriage 24, consists of an element having the base 26, one end 27 of which is reduced in thickness, forming the shoulder 28. The member 27 has a square hole 29 in its outer end portion, said hole being offset from the longitudinal axis 30, of the element 27. The element 27 also has a round hole 31 extending through the element 27 and the hub 32. Within the hole 31 is a bushing 33. The element 26 carries a revoluble ball-bearing roller 34, mounted upon shaft 35. Placeable within the hole 29 is a slide block 36, having a hole 37 therethrough. An eccentric dog, referred to generally as 38, consists of an arm 39, outwardly extended into an enlarged portion 40, the other end portion of 39 carrying a stub shafting consisting of the element 41 and the element 42, these elements 41 and 42 not being in axial alignment. A threaded hole 43 extends through the elements 41 and 42. The second main element 44 of the carriage consists of the base 45 having a V-shaped recess 46 at its outer end, the base 45, the two revoluble ball-bearing rollers 47 and 48 and also the shaft 49 with the threaded extension 50 and the fixed pin 51. A leaf spring 52 is fixedly attached to the element 45 at 53, 53 and bears upon the face of the enlarged portion 40 of the element 39.

The assembly of the roller carriage is as follows:—

The block 36 is inserted within the hole 29 of element 27, the element 42 is inserted within the hole 37 of block 36, the three elements thus assembled are fastened together by means of the screw 85; the shaft 49 is inserted within the bushing 33 of the hole 31 of member 27; the base 45 thus abutting upon the face of the element 27.

The hub 32 passes through an opening 54 in a carriage arm, and is pivotally held therein by means of the washer 55 and the nut 56 threaded upon the threaded extension 50.

A roller carriage similar to that described is carried by each of the carriage arms 21, 21', 23 and 23', as clearly shown in the drawings.

Revolubly carried by the drive shaft 11 are two cam members, referred to generally as 57 and 57' and which constitute the driven member, these two cam members 57 and 57' are fixedly attached to each other by the curved plate members 58, 58, by means of bolts 59, 59.

The cam member 57 consists of the annular plate 60 fixedly attached to the driven shaft 61. The inner face of the plate 60 carries the extended annular wall 62 and the extended annular solid central portion 63, thus forming a circular cam run way 64. The lower end of the drive shaft 11 is revolubly retained in the annular recess 65 of the element 63, said recess 65 being positioned eccentrically with respect to the cam runway 64. The rollers carried by the carriages 24 and 25 being positioned within the cam runway 64, the rollers 48, 48 abutting upon the outer wall of the runway and the rollers 47, 47, 34, 34, abutting upon the inner face of the cam runway.

The other cam member 57' is similarly constructed and is revoluble upon the drive shaft 11, within the cam runway of which the roller 47', 47', 34, and 34' operates as described.

It is to be noted, however, that the two cam runways 64 and 64' are positioned oppositely eccentrically with respect to the drive shaft 11, that is, the longest radius X of the cam 57' is positioned in the same vertical plane as the shortest radius Y of the cam 57.

The operation of the device is as follows:—

A revoluble movement is given the shaft 17 which is converted into a revoluble movement of the drive shaft 11. This revoluble movement of the drive shaft 11 has a natural tendency to give the carriage arms 21, 21', 23 and 23' an outward centrifugal movement around their pivotal points 20, 22, 20' and 22'.

This outward centrifugal movement of carriage arms 21, 21', 23, 23' with carriages 24, 24', 25, 25' in traveling from shortest radius of cam Y to longest radius of cam X would require a measurable period of time which would establish a natural pathway for rollers 48, 48', 47, 47', 34, 34' depending on speed at which drive member rotates.

This pathway, however, would not be the same shape as runways 64, 64' in which rollers 48, 48', 47, 47', 34, 34' are compelled to travel, but is somewhere through face of center solid member 63 of cam.

Therefore in traveling from Y to X or shortest radius to longest radius of cam, this center member 63 would offer an obstacle over which rollers 47, 47', 34, 34' would be compelled to roll thus pushing out carriage arms at a greater speed than if allowed to travel their natural pathways, causing rollers 47, 47', 34, 34' to exert a pressure on inner cam wall which would tend to revolve the driven member.

After reaching the longest radius X, the carriage arms endeavor to continue this outward movement but are restrained by rollers 48, 48' causing pressure on the outer wall of the runway which would also cause the driven member to revolve.

The results are as follows:—

Traveling from Y to X or shortest radius to longest radius pressures are on inner cam wall by rollers 47, 47', 34, 34'.

Traveling from X to Y or longest to shortest, pressures are on outer cam wall by rollers 48, 48'.

The rollers 47, 34, 47' and 34' are maintained in contact and abutment upon the inner face of the cam run ways 64 and 64' as follows:—

The elements 41 and 42 are positioned eccentrically with respect to the pivotal point 43 of the member 38 and hence the movement of the element 40 will cause a divergence of movement between the member 44 carrying two rollers 47 and 48 and the member carrying a roller 34 and as the roller 48 bears upon the outer face of the runway caused by centrifugal force, the outward position of the element 40, caused by the spring 52 or by centrifugal force will force the two rollers 47 and 34 inwardly against the inner face of the cam run way.

Figure 1:
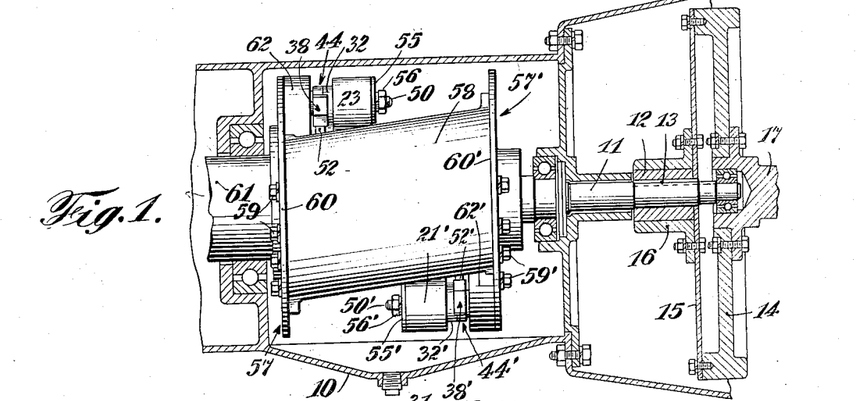
Figure 1 is a central vertical section showing the assembled power unit mounted in a casing.
Figure 2:
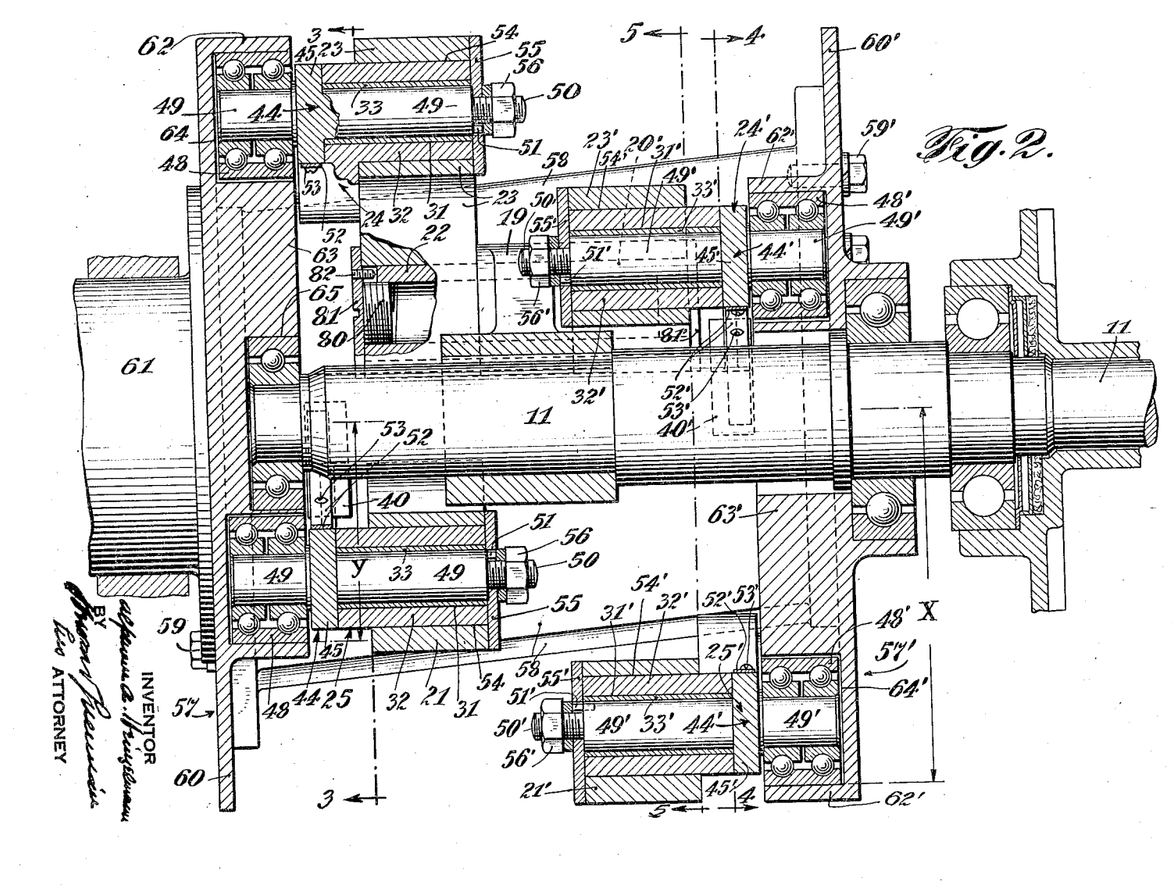
Figure 2 is a central longitudinal section taken on the lines 2—2 of Figures 3 and 4 respectively.
Figures 3, 5:
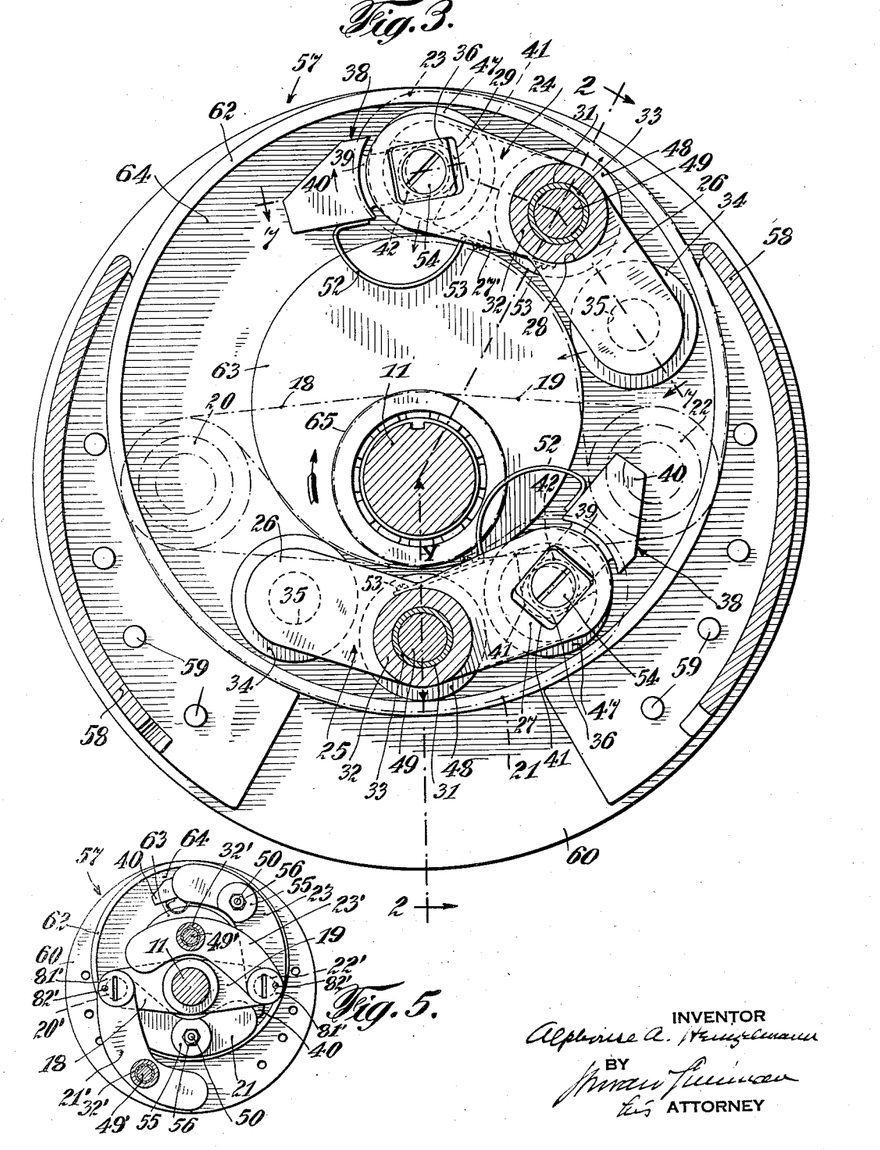
Figure 3 is a cross section taken on the line 3—3 of Figure 2.
Figure 5 is a cross section taken on the line 5—5 of Figure 2 on reduced scale.
Figure 4:
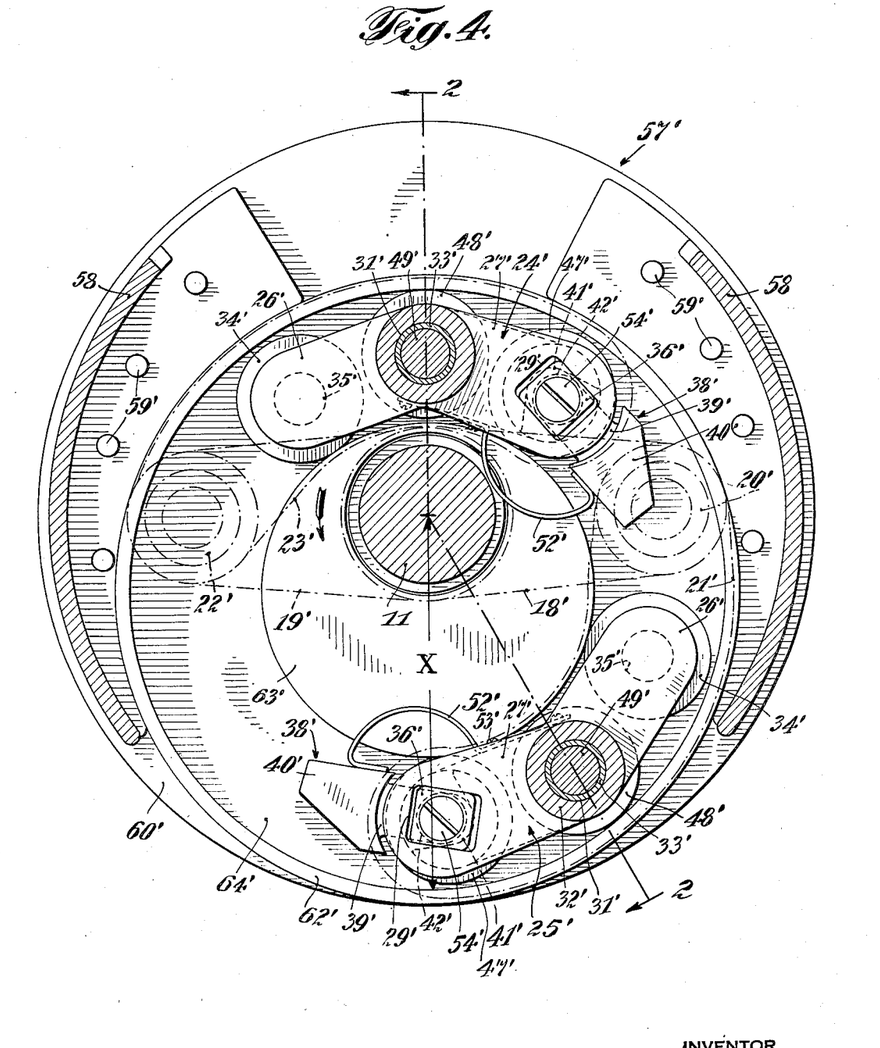
Figure 4 is a cross section taken on the line 4—4 of Figure 2.
Figure 6:
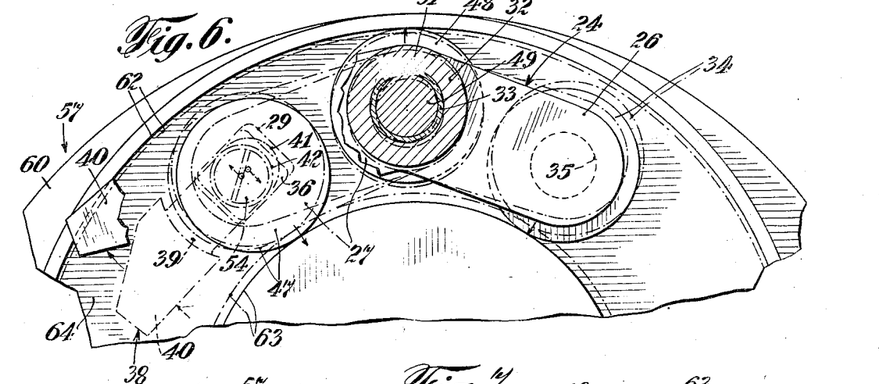
Figure 6 is a fragmentary sectional elevation view illustrating the position of the rollers when the cam run way walls have been subjected to wear.
Figure 7:
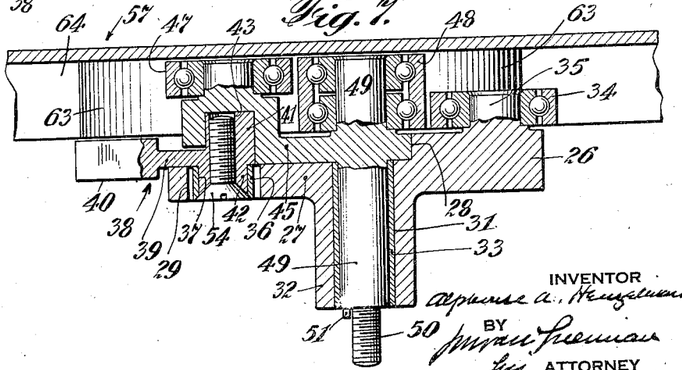
Figure 7 is a longitudinal section taken on the line 7—7 of Figure 3.
Figure 8:
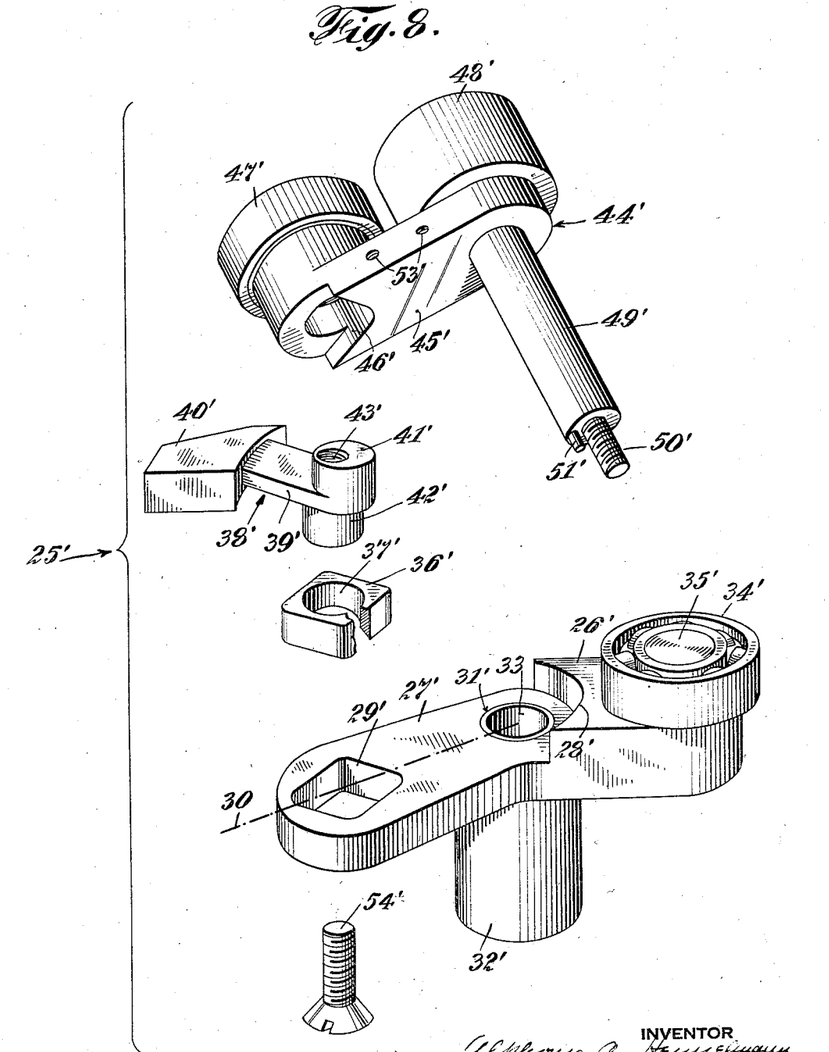
Figure 8 is an exploded perspective view of the carriage elements.

This last described movement not only causes a forced abutment of the two rollers of each carriage against the inner wall of the cam run way but is also a most effective means for taking up, and overcoming, any wear caused to the faces of the run way, as is clearly shown in Figure 6, in which the dot-and-dash position represents the normal position of the take up mechanism and the faces of the walls of the cam run way and in which the full lines show the position of the take-up mechanism and of the faces of the walls of the cam runway, when the latter have been subjected to excessive wear.

It is to be noted that the roller 48 abuts upon the face of the outer camway wall and is free from contact with the inner wall, while the rollers 47 and 34 abut upon the face of the inside wall of the camway and are free from contact with the outer wall.

It is evident from the foregoing that the revolution of the drive shaft will cause a revolution of the driven shaft through the medium of the abutment of the rollers upon the faces of the walls of the cam runway.

It is further evident that the device can be constructed with only one cam run way and co-acting elements, but I prefer to employ two camways as described, as greater efficiency and smoothness of operation are thus obtained.

Figure 9:
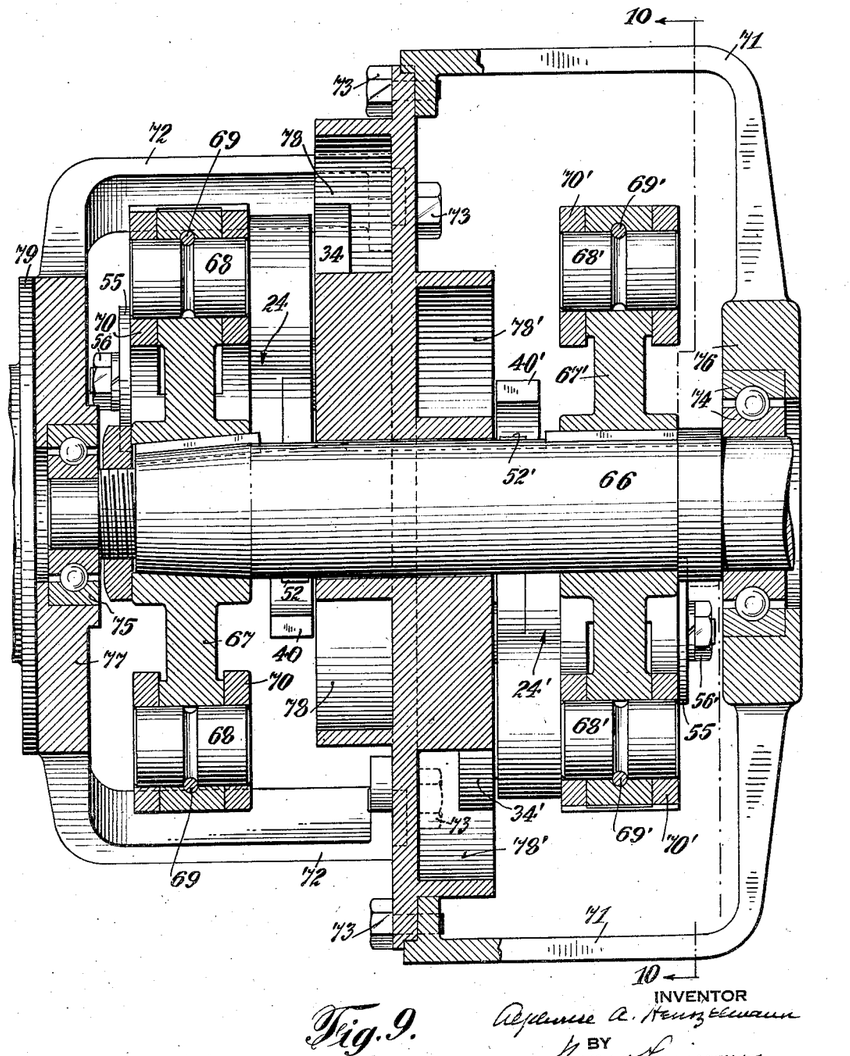
Figure 9 is a central vertical section taken on the line 9—9 of Figure 10 illustrating a modification of my invention.
Figure 10:
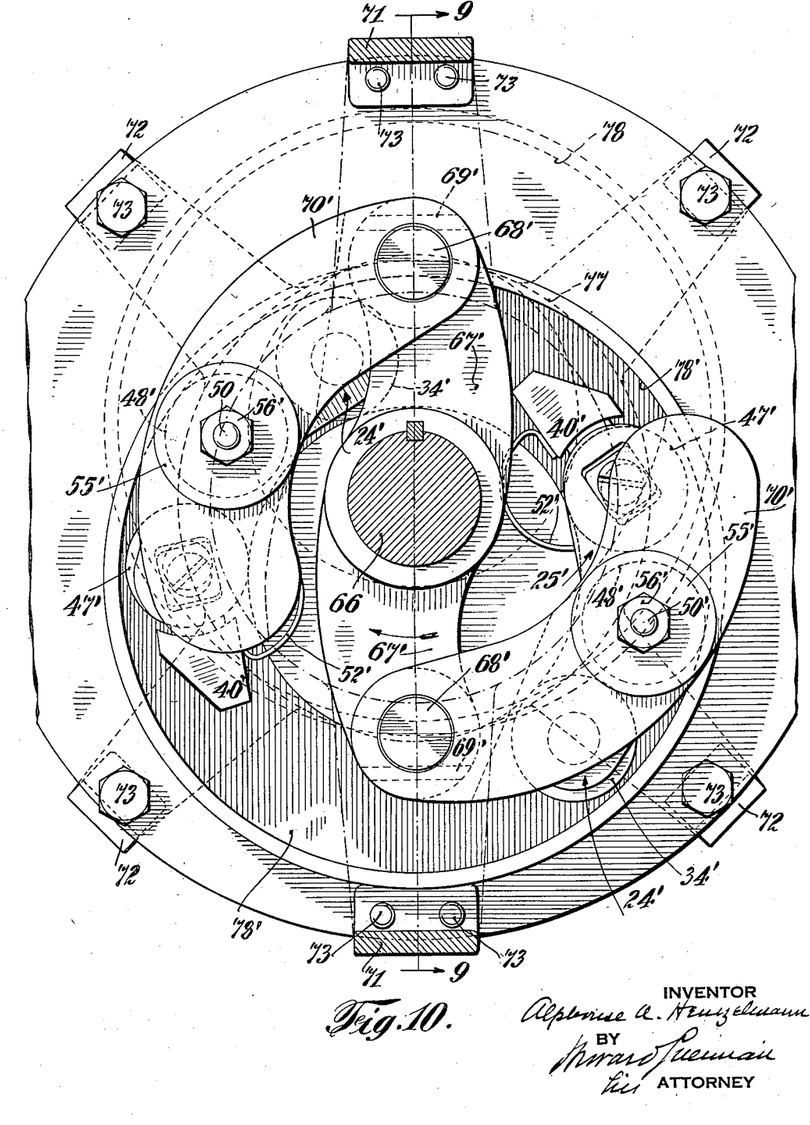
Figure 10 is a section taken on the line 10—10 of Figure 9.

The modified form of my device shown in Figures 9 and 10 consists of a revoluble drive shaft 66, carrying two fixedly attached spiders having the extended arms 67 and 67'. Each spider arm 67 carries a fixedly attached pintle 68 and retained in position by a pin 69, this pintle 68 acting as a pivotal point for the forked carriage's arm 70.

The roller carriages referred to generally as 24, 25, 24' and 25' consist each of two main elements as herein described.

Each carriage arm 70, 70', is in construction and arrangement of attached elements similar to that previously described.

Positioned between the mentioned spiders is a double cam element revoluble about the drive shaft 66 and supported by a plurality of arms 71 and 72, bolted together by bolts 73, 73. The drive shaft 66 is revoluble within ball bearings 74 and 75 of the hubs 76 and 77 of the arms 71 and 72.

This double cam element consists of an annular member having circular runways 78 and 78' in its opposite faces, said cam runways being positioned eccentrically to each other and to drive shaft 66.

The driven member 79 is fixedly attached to the hub 77 of the arms 72, 72.

The operation of the modified form of my device shown in Figures 9 and 10 is similar to that shown in Figures 1 to 8 and previously described.

I have employed the terms "drive member" and "driven member" to designate certain elements of my device but it is evident that these terms may be employed in a reverse sense.

It will be seen from the accompanying drawings, and the descriptions thereof that a revoluble movement of the drive member will cause a revolution of the driven member through the medium of the centrifugally operating members contacting with the run way walls, and as these runways are circular in formation the movement is smooth and regular and without the intermittent impacts and resultant vibrations, noise and wear upon the runway walls which are incident to the employment of non-circular runways.

I do not limit myself to the size, number, shape or arrangement of parts as shown and described as these are given simply as a means for clearly describing the device of my invention.

What I claim is:—

1. In a device of the character described, in combination, a revoluble drive member, a revoluble driven member, a circular two-walled depressed runway having parallel side walls carried by said driven member and positioned eccentrically to said drive member, centrifugally movable members pivotally carried by said drive member and means carried by said centrifugally movable members abutting upon the walls of said runway and so positioned that the revolution of the drive member will revolve the driven member.

2. In a device of the character described, in combination, a revoluble drive member, a revoluble driven member, a circular two-walled depressed runway having parallel side walls carried by said driven member and positioned eccentrically to said drive member, centrifugally movable members pivotally carried by said drive member and revoluble means carried by said centrifugally movable members abutting upon the walls of said runway and so positioned that the revolution of the drive member will revolve the driven member.

3. In a device of the character described, in combination, a revoluble drive member, a revoluble driven member, a circular two-walled depressed runway having parallel side walls carried by said driven member and positioned eccentrically to said drive member, centrifugally movable members pivotally carried by said drive member and a plurality of rollers carried by said centrifugally movable members abutting upon the walls of said runway and so positioned that the revolution of the drive member will revolve the driven member.

4. In a device of the character described, in combination, a revoluble drive member, a revoluble driven member, a circular two-walled depressed runway having parallel side walls carried by said driven member and positioned eccentrically to said drive member, centrifugally movable members pivotally carried by said drive member and a plurality of means carried by said centrifugally movable members, some of said means abutting upon the outer wall of said runway and free from contact with the inner wall of said runway, the others of said means abutting upon the inner wall of said runway and free from contact with the outer wall of said runway, said means being so positioned that the revolution of the drive member will revolve the driven member.

5. In a device of the character described, in combination a revoluble drive member, a revoluble driven member, a circular two-walled depressed runway having parallel side walls carried by said driven member and positioned eccentrically to said drive member, centrifugally movable members pivotally carried by said drive member and a plurality of revoluble means carried by said centrifugally movable member, some of said means abutting upon the outer wall of said runway and free from contact with the inner wall of said runway, the others of said means abutting upon the inner wall of said runway and free from contact with the outer wall of said runway, said means being so positioned that the revolution of the drive member will revolve the driven member.

6. In a device of the character described, in combination, a revoluble drive member, a revoluble driven member, a circular two-walled depressed runway having parallel side walls carried by said driven member and positioned eccentrically to said drive member, centrifugally movable members pivotally carried by said drive member and a plurality of rollers carried by said centrifugally movable members, some of said rollers abutting upon the outer wall of said runway and free from contact with the inner wall of said runway, the others of said rollers abutting upon the inner wall of said runway and free from contact with the outer wall of said runway, said rollers being so positioned that the revolution of the drive member will revolve the driven member.

7. In a device of the character described, in combination, a revoluble drive member, a revoluble driven member, a circular two-walled depressed runway having parallel side walls carried by said driven member and positioned eccentrically to said drive member, centrifugally movable members pivotally carried by said drive member, means carried by said centrifugally movable members abutting upon the walls of said runway and means forcibly causing said abutments, said means carried by the centrifugally movable member being so positioned that the revolution of the drive member will revolve the driven member.

8. In a device of the character described, in combination, a revoluble drive member, a revoluble driven member, a circular two-walled depressed runway having parallel side walls carried by said driven member and positioned eccentrically to said drive member, centrifugally movable members pivotally carried by said drive member, revoluble means carried by said centrifugally movable members abutting upon the walls of said runway and means forcibly causing said abutments, said means carried by the centrifugally movable member being so positioned that the revolution of the drive member will revolve the driven member.

9. In a device of the character described, in combination, a revoluble drive member, a revoluble driven member, a circular two-walled depressed runway having parallel side walls carried by said driven member and positioned eccentrically to said drive member, centrifugally movable members pivotally carried by said drive member, a plurality of rollers carried by said centrifugally movable members abutting upon the walls of said runway and means forcibly causing said abutments, said rollers carried by the centrifugally movable member being so positioned that the revolution of the drive member will revolve the driven member.

10. In a device of the character described, in combination, a revoluble drive member, a revoluble driven member, a circular two-walled depressed runway having parallel side walls carried by said driven member and positioned eccentrically to said drive member, centrifugally movable members pivotally carried by said drive member, a plurality of means carried by said centrifugally movable members, some of said means abutting upon the outer wall of said runway and free from contact with the inner wall of said runway, the others of said means abutting upon the inner wall of said runway and free from contact with the outer wall of said runway and means forceably causing said abutments, said means carried by said centrifugally movable member being so positioned that the revolution of the drive member will revolve the driven member.

11. In a device of the character described, in combination, a revoluble drive member, a revoluble driven member, a circular two-walled depressed runway having parallel side walls carried by said driven member and positioned eccentrically to said drive member, centrifugally movable members pivotally carried by said drive member, a plurality of revoluble means carried by said centrifugally movable members, some of said means abutting upon the outer wall of said runway and free from contact with the inner wall of said runway, the others of said means abutting upon the inner wall of said runway and free from contact with the outer wall of said runway and means forcibly causing said abutments, said means carried by said centrifugally movable member being so positioned that the revolution of the drive member will revolve the driven member.

12. In a device of the character described, in combination, a revoluble drive member, a revoluble driven member, a circular two-walled depressed runway having parallel side walls carried by said driven member and positioned eccentrically to said drive member, centrifugally movable members pivotally carried by said drive member, a plurality of rollers carried by said centrifugally movable members, some of said rollers abutting upon the outer wall of said runway and free from contact with the inner wall of said runway, the others of said rollers abutting upon the inner wall of said runway and free from contact with the outer wall of said runway and means forceably causing said abutments, said rollers carried by said centrifugally movable member being so positioned that the revolution of the drive member will revolve the driven member.

13. In a device of the character described, in combination, a revoluble drive member; a revoluble driven member; two circular two-walled depressed runways having parallel side walls carried by said driven member, said runways being positioned eccentrically to said drive member and to each other, centrifugally movable members pivotally carried by said drive member and means carried by said centrifugally movable members abutting upon the walls of said runways and so positioned that the revolution of the drive member will revolve the driven member.

14. In a device of the character described, in combination, a revoluble drive member, a revoluble driven member, two circular two-walled depressed runways having parallel side walls carried by said driven member, said runways being positioned eccentrically to said drive members and to each other, centrifugally movable members pivotally carried by said drive member and revoluble means carried by said centrifugally movable members abutting upon the walls of said runways and so positioned that the revolution of the drive member will revolve the driven member.

15. In a device of the character described, in combination, a revoluble drive member; a revoluble driven member; two circular two-walled depressed runways having parallel side walls carried by said driven member, said runways, being positioned eccentrically to said drive member and to each other, centrifugally movable members pivotally carried by said drive member, a plurality of means carried by said centrifugally movable members, some of said means abutting upon the outer wall of said runway and free from contact with the inner wall of said runway, the others of said means abutting upon the inner wall of said runway and free from contact with the outer wall of said runway and means forceably causing said abutments, said means carried by said centrifugally movable member being so positioned that the revolution of the drive member will revolve the driven member and means carried by said centrifugally movable members abutting upon the walls of said runways and so positioned that the revolution of the drive member will revolve the driven member.

16. In a device of the character described, in combination, a revoluble drive member; a revoluble driven member; two circular two-walled depressed runways having parallel side walls carried by said driven member, said runways being positioned eccentrically to said drive member and to each other, centrifugally movable members pivotally carried by said drive member, a plurality of revoluble means carried by said centrifugally movable members, some of said means abutting upon the outer wall of said runway and free from contact with the inner wall of said runway, the others of said means abutting upon the inner wall of said runway and free from contact with the outer wall of said runway and means forceably causing said abutments, said means carried by said centrifugally movable member being so positioned that the revolution of the drive member will revolve the driven member and means carried by said centrifugally movable members abutting upon the walls of said runways and so positioned that the revolution of the drive member will revolve the driven member.

17. In a device of the character described, in combination, a revoluble drive member; a revoluble driven member; two circular two-walled depressed runways having parallel side walls carried by said driven member, said runways being positioned eccentrically to said drive member and to each other, centrifugally movable members pivotally carried by said drive member, a plurality of rollers carried by said centrifugally movable members, some of said rollers abutting upon the outer wall of said runway and free from contact with the inner wall of said runway, the others of said rollers abutting upon the inner wall of said runway and free from contact with the outer wall of said runway and means forceably causing said abutments, said rollers carried by said centrifugally movable member being so positioned that the revolution of the drive member will revolve the driven member, and means carried by said centrifugally movable members abutting upon the walls of said runways and so positioned that the revolution of the drive member will revolve the driven member.

18. In a device of the character described, in combination, a revoluble drive member; a revoluble driven member; two circular two-walled depressed runways having parallel side walls carried by said driven member, said runways being positioned eccentrically to said drive member and to each other, centrifugally movable members pivotally carried by said drive member, means carried by said centrifugally movable members abutting upon the walls of said runway and means forcibly causing said abutments, said means carried by the centrifugally movable member being so positioned that the revolution of the drive member will revolve the driven member.

19. In a device of the character described, in combination, a revoluble drive member; a revoluble driven member; two circular two-walled depressed runways having parallel side walls carried by said driven member, said runways being positioned eccentrically to said drive member and to each other, centrifugally movable members pivotally carried by said drive member, revoluble means carried by said centrifugally movable members abutting upon the walls of said runway and means forceably causing said abutments, said means carried by the centrifugally movable member being so positioned that the revolution of the drive member will revolve the driven member.

20. In a device of the character described, in combination, a revoluble drive member; a revoluble driven member; two circular two-walled depressed runways having parallel side walls carried by said driven member, said runways being positioned eccentrically to said drive member and to each other, centrifugally movable members pivotally carried by said drive member, a plurality of rollers carried by said centrifugally movable members abutting upon the walls of said runway, and means forceably causing said abutments, said rollers carried by the centrifugally movable member being so positioned that the revolution of the drive member will revolve the driven member.

21. In a device of the character described, in combination, a revoluble drive member; a revoluble driven member; two circular two-walled depressed runways having parallel side walls carried by said driven member, said runways being positioned eccentrically to said drive member and to each other, centrifugally movable members pivotally carried by said drive member, and a plurality of means carried by said centrifugally movable member, some of said means abutting upon the outer wall of said runway and free from contact with the inner wall of said runway, the others of said means abutting upon the inner wall of said runway and free from contact with the outer wall of said runway, said means being so positioned that the revolution of the drive member will revolve the driven member.

22. In a device of the character described, in combination, a revoluble drive member, a revoluble driven member; two circular two-walled depressed runways having parallel side walls carried by said driven member, said runways being positioned eccentrically to said drive member and to each other, centrifugally movable members pivotally carried by said drive member, a plurality of revoluble means carried by said centrifugally movable members, some of said means abutting upon the outer wall of said runway and free from contact with the inner wall of said runway, the others of said means abutting upon the inner wall of said runway and free from contact with the outer wall of said runway, said means being so positioned that the revolution of the drive member will revolve the driven member.

23. In a device of the character described, in combination, a revoluble drive member; a revoluble driven member; two circular two-walled depressed runways having parallel side walls carried by said driven member, said runways being positioned eccentrically to said drive member and to each other, centrifugally movable members pivotally carried by said drive member, and a plurality of rollers carried by said centrifugally movable members, some of said rollers abutting upon the outer wall of said runway and free from contact with the inner wall of said runway, the others of said rollers abutting upon the inner wall of said runway and free from contact with the outer wall of said runway, said rollers being so positioned that the revolution of the drive member will revolve the driven member.

24. In a device of the character described, in combination, a revoluble drive member, a revoluble driven member, two circular two-walled depressed runways having parallel side walls carried by said driven member, said runways facing inwardly toward each other and being positioned eccentrically to said drive member and to each other, centrifugally movable members pivotally carried by said drive member and, means carried by said centrifugally movable members abutting upon the walls of said runways and so positioned that the revolution of the drive member will revolve the driven member.

25. In a device of the character described, in combination, a revoluble drive member; a revoluble driven member, two circular two-walled depressed runways having parallel side walls carried by said driven member, said runways facing inwardly toward each other and being positioned eccentrically to said drive member and to each other, centrifugally movable members pivotally carried by said drive member and revoluble means carried by said centrifugally movable members abutting upon the walls of said runways and so positioned that the revolution of the drive member will revolve the driven member.

26. In a device of the character described, in combination, a revoluble drive member; a revoluble driven member; two circular two-walled depressed runways having parallel side walls carried by said driven member, said runways facing inwardly toward each other and being positioned eccentrically to said drive member and to each other, centrifugally movable members pivotally carried by said drive member, a plurality of means carried by said centrifugally movable members, some of said means abutting upon the outer wall of said runway and free from contact with the inner wall of said runway, the others of said means abutting upon the inner wall of said runway and free from contact with the outer wall of said runway and means forceably causing said abutments, said means carried by said centrifugally movable member being so positioned that the revolution of the drive member will revolve the driven member and means carried by said centrifugally movable members abutting upon the walls of said runways and so positioned that the revolution of the drive member will revolve the driven member.

27. In a device of the character described, in combination, a revoluble drive member; a revoluble driven member; two circular two-walled depressed runways having parallel side walls carried by said driven member, said runways facing inwardly toward each other and being positioned eccentrically to said drive member and to each other, centrifugally movable members pivotally carried by said drive member, a plurality of revoluble means carried by said centrifugally movable members, some of said means abutting upon the outer wall of said runway and free from contact with the inner wall of said runway, the others of said means abutting upon the inner wall of said runway and free from contact with the outer wall of said runway and means forceably causing said abutments, said means carried by said centrifugally movable member being so positioned that the revolution of the drive member will revolve the driven member, and means carried by said centrifugally movable members abutting upon the walls of said runways and so positioned that the revolution of the drive member will revolve the driven member.

28. In a device of the character described, in combination, a revoluble drive member; a revoluble driven member; two circular two-walled depressed runways having parallel side walls carried by said driven member, said runways facing inwardly toward each other and being positioned eccentrically to said drive member and to each other, centrifugally movable members pivotally carried by said drive member, means carried by said centrifugally movable members abutting upon the walls of said runway and means forceably causing said abutments, said means carried by the centrifugally movable member so positioned that the revolution of the drive member will revolve the driven member.

29. In a device of the character described, in combination, a revoluble drive member; a revoluble driven member; two circular two-walled depressed runways having parallel side walls carried by said driven member, said runways facing inwardly toward each other and being positioned eccentrically to said drive member and to each other, centrifugally movable members pivotally carried by said drive member, revoluble means carried by said centrifugally movable members abutting upon the walls of said runway and means forceably causing said abutments, said means carried by the centrifugally movable member being so positioned that the revolution of the drive member will revolve the driven member.

30. In a device of the character described, in combination, a revoluble drive member; a revoluble driven member; two circular two-walled depressed runways having parallel side walls carried by said driven member, said runways facing inwardly toward each other and being positioned eccentrically to said drive member and to each other, centrifugally movable members pivotally carried by said drive member and a plurality of means carried by said centrifugally movable members, some of said means abutting upon the outer wall of said runway and free from contact with the inner wall of said runway, the others of said means abutting upon the inner wall of said runway and free from contact with the outer wall of said runway, said means being so positioned that the revolution of the drive member will revolve the driven member.

31. In a device of the character described, in combination, a revoluble drive member; a revoluble driven member; two circular two-walled depressed runways having parallel side walls carried by said driven member, said runways facing inwardly toward each other and being positioned eccentrically to said drive member and to each other, centrifugally movable members pivotally carried by said drive member and a plurality of revoluble means carried by said centrifugally movable members some of said means abutting upon the outer wall of said runway and free from contact with the inner wall of said runway, the others of said means abutting upon the inner wall of said runway and free from contact with the outer wall of said runway, said means being so positioned that the revolution of the drive member will revolve the driven member.

32. In a device of the character described, in combination, a revoluble drive shaft, a spider fixedly connected to said drive shaft, a carriage arm pivotally carried by each arm of said spider, a roller carriage pivotally carried by each carriage arm, a plurality of rollers carried by each roller carriage, a driven member and a two walled circular depressed runway having parallel side walls carried by said driven member, said rollers being so positioned within said runway that the revolution of the drive shaft will revolve the driven member.

33. In a device of the character described, in combination, a revoluble drive shaft, a spider fixedly connected to said drive shaft, a carriage arm pivotally carried by each arm of said spider, a roller carriage pivotally carried by each carriage arm, a plurality of rollers carried by each roller carriage, a driven member, a two-walled circular depressed runway having parallel side walls carried by said driven member, means for maintaining a forceable abutment between said rollers and the side walls of said runway, said rollers being so positioned within said runway that the revolution of the drive shaft will revolve the driven member.

34. In a device of the character described, in combination, a revoluble drive shaft, a spider fixedly connected to said drive shaft, a carriage arm pivotally carried by each arm of said spider, a roller carriage pivotally carried by each carriage arm, a plurality of rollers carried by each roller carriage, a driven member, a two-walled circular depressed runway having parallel side walls carried by said driven member, means for maintaining some of said rollers in constant contact with the outer wall of said runway and free from contact with the inner wall thereof, means for maintaining the remainder of said rollers in constant contact with the inner wall of said runway and free from contact with the outer wall thereof, said rollers being so positioned within said runway that the revolution of the drive shaft will revolve the driven member.

35. In a device of the character described, in combination, a revoluble drive shaft, a spider fixedly connected to said drive shaft, a plurality of carriage arms pivotally carried by each arm of said spider, a roller carriage pivotally carried by each carriage arm, and a plurality of rollers carried by each roller carriage, a driven member, two circular two-walled depressed runways having parallel side walls carried by said driven member, said rollers being so positioned within said runways that the revolution of the drive shaft will revolve the driven member.

36. In a device of the character described, in combination, a revoluble drive shaft, a spider fixedly connected to said drive shaft, a plurality of carriage arms pivotally carried by each arm of said spider, a roller carriage pivotally carried by each carriage arm, a plurality of rollers carried by each roller carriage, a driven member, two circular two-walled depressed runways having parallel side walls carried by said driven member, means for maintaining a forceable abutment between said rollers and the side walls of said runways, said rollers being so positioned within said runways that the revolution of the drive shaft will revolve the driven member.

37. In a device of the character described, in combination, a revoluble drive shaft, a spider fixedly connected to said drive shaft, a plurality of carriage arms pivotally carried by each arm of said spider, a roller carriage pivotally carried by each carriage arm, a plurality of rollers carried by each roller carriage, a driven member, two circular two-walled depressed runways having parallel side walls carried by said driven member, means for maintaining some of said rollers in constant contact with the outer walls of said runways and free from contact with the inner walls thereof, means for maintaining the remainder of said rollers in constant contact with the inner walls of said runways and free from contact with the outer walls thereof.

38. In a device of the character described, in combination, a revoluble drive shaft, a spider fixedly connected to said drive shaft, a plurality of carriage arms pivotally carried by each arm of said spider, a roller carriage pivotally carried by each carriage arm, and a plurality of rollers carried by each roller carriage, a driven member, two circular two-walled depressed runways having parallel side walls carried by said driven member, said runways being positioned eccentrically to said drive member and to each other, said rollers being so positioned within said runways that the revolution of the drive shaft will revolve the driven member.

39. In a device of the character described, in combination, a revoluble drive shaft, a plurality of spiders fixedly connected to said drive shaft, a plurality of carriage arms pivotally carried by each arm of said spider, a roller carriage pivotally carried by each carriage arm, and a plurality of rollers carried by each roller carriage, a driven member, two circular two-walled runways carried by said driven member, said rollers being so positioned within said runways that the revolution of the drive shaft will revolve the driven member.

40. In a device of the character described, in combination, a revoluble drive shaft, a plurality of spiders, fixedly connected to said drive shaft, a plurality of carriage arms pivotally carried by each arm of said spider, a roller carriage pivotally carried by each carriage arm, a plurality of rollers carried by each roller carriage, a driven member, two circular two-walled depressed runways having parallel side walls carried by said driven member, means for maintaining a forceable abutment between said rollers and the side walls of said runways, said rollers being so positioned within said runways that the revolution of the drive shaft will revolve the driven member.

41. In a device of the character described, in combination, a revoluble drive shaft, a spider fixedly connected to said drive shaft, a plurality of carriage arms pivotally carried by each arm of said spider, a roller carriage pivotally carried by each carriage arm, a plurality of rollers carried by each roller carriage, a driven member, two circular two-walled runways carried by said driven member, means for maintaining some of said rollers in constant-contact with the outer walls of said runways and free from contact with the inner walls thereof, means for maintaining the remainder of said rollers in constant-contact with the inner walls of said runways and free from contact with the outer walls thereof, said rollers being so positioned within said runways that the revolution of the drive shaft will revolve the driven member.

ALPHONSE A. HEINZELMANN.